US007957996B2

(12) United States Patent
Goldberg et al.

(10) Patent No.: US 7,957,996 B2
(45) Date of Patent: Jun. 7, 2011

(54) MARKET EXPANSION THROUGH OPTIMIZED RESOURCE PLACEMENT

(75) Inventors: William D. Goldberg, Cary, NC (US); William E. Hutson, Cary, NC (US); Christopher H. Wicher, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2198 days.

(21) Appl. No.: 10/814,541

(22) Filed: Mar. 31, 2004

(65) Prior Publication Data

US 2005/0222883 A1    Oct. 6, 2005

(51) Int. Cl.
G05B 19/418 (2006.01)
G06F 9/46 (2006.01)
(52) U.S. Cl. ..................................... 705/7.12
(58) Field of Classification Search .................. 705/8
See application file for complete search history.

(56) References Cited

U.S. PATENT DOCUMENTS

| 6,895,382 B1* | 5/2005 | Srinivasan et al. ............... 705/7 |
| 7,548,871 B2* | 6/2009 | Ricketts ........................... 705/8 |
| 2005/0065831 A1* | 3/2005 | Keay et al. ...................... 705/8 |
| 2007/0033060 A1* | 2/2007 | Gopalan et al. .................. 705/1 |

OTHER PUBLICATIONS

Simeon Preston. (2004). Lost in migration: offshore need not mean outsourced. Strategy & Leadership, 32(6), 32-36. Retrieved Jul. 14, 2009, from ABI/INFORM Global. (Document ID: 763997381).*
McLellan, Kerry, & Marcolin, Barbara. (Oct. 1994). Information technology outsourcing. Business Quarterly, 59(1), 95-104. Retrieved Jul. 14, 2009, from ABI/INFORM Global. (Document ID: 7456).*
Ojelanki K. Ngwenyamaa, and Noel Brysonb (1999 ) Theory and Methodology Making the information systems outsourcing decision: A transaction cost approach to analyzing outsourcing decision problems, European Journal of Operational Research vol. 115, Issue 2, Jun. 1, 1999, pp. 351-367.*
L. Willcocksa, M. Lacityb, and G. Fitzgerald (1995) Information technology outsourcing in Europe and the USA: Assessment issues International Journal of Information Management vol. 15, Issue 5, Oct. 1995, pp. 333-351.*
Handel, Thomas. "Identifying and selecting Outsource Providers." Contract Pharma Apr.-May 2000.*
Lee, Jae-Nam, Minh Q. Huynh, Kwok Ron Chi-wai, and Shih-Ming Pi. The Evolution of Outsourcing Research: What is the Next Issue? Proc. of Proceedings of the 33rd Hawaii International Conference on System Sciences, Hawaii. IEEE Xplore, 2000.*
Baker, Sunny. Complete idiot's guide to project management. Indianapolis, IN: Alpha Books, 2000.*
Lin, Zheng-Kui, Jian-Jun Wang, and Yi-Yan Qin. "A Decision Model for Selecting an Offshore Outsourcing Location: Using a Multicriteria Method." IEEE (2007).*
Forman, Ernest et al. "Decision by Objectives," World Scientific 2001.*

\* cited by examiner

Primary Examiner — Andre Boyce
Assistant Examiner — Folashade Anderson
(74) Attorney, Agent, or Firm — Marcia L. Doubet

(57) ABSTRACT

A company's ability to expand its market presence by delivering value to emerging and immature markets is influenced by its ability to develop a rich and differentiated value net within these emerging markets. Techniques are disclosed for making resource placement decisions in an objective manner, using results from a value chain analysis. Geographies or locations that are candidates for the resource placement are analyzed in terms of a set of criteria which, in preferred embodiments, are directed toward identifying strengths and weaknesses of each location as part of an overall value chain.

9 Claims, 12 Drawing Sheets

| | | |
|---|---|---|
| 510 | Criterion: Prog. language - Java | |
| 520 | Definition | Evaluates Java programming language skills for product X. |
| 530 | Information Required | Understands general concepts of object-oriented programming. Has formal training in object-oriented programming. Has experience in using object-oriented programming. Understands general concepts of Java programming language. Has formal training in Java programming language. Has experience in using Java programming language. Familiar with J2EE. ... |
| 540 | Measurement Guidelines | Compare the candidate location to the product information. Use the following rating scale: <br><br> 5 Significantly exceeds requirements <br> 4 Exceeds requirements <br> 3 Meets requirements <br> 2 Minor deviations from requirements <br> 1 Significant deviations from requirements |

| Product Profile | | |
|---|---|---|
| | | Local Skills — 410 |
| 601 | 5 | Design/Development |
| | 3 | Test |
| | 3 | Maintenance/Support |
| | 2 | Integration |
| | 2 | Prog. Language - C |
| | 2 | Prog. Language - C++ |
| | 5 | Prog. Language - Java |
| | 5 | OS / Windows |
| | 5 | OS - Linux |
| | 3 | OS - AIX |
| 602 | 5 | Language - English |
| 603 | 1 | Language - Chinese |
| | 1 | Language - Japanese |

Overall Marketplace — 420
- 604 3   WW Market Opportunity
- 3   WW CGR
- 2   WW Market Share

Geography Marketplace — 430
- Market Opportunity
- Market CGR
- Market Share

Geography Environment — 440
- Personnel Cost
- General Business Cost
- Attrition (1=Highest)
- Growth Rate

Product Sales/Delivery — 450
- 2   Share Integration, Support, and Sales Force
- 3   Share Business Partners
- 2   Share Spiral Partners

Competitors Strength — 460
- 4   WW
- 3   In Geography Market
-    Ingrained in competitive technology

FIG. 7

| 710 Market Share | 720 Revenue | 730 Reduce Costs | | Local Skills |
|---|---|---|---|---|
| 0.4 | 0.4 | | | Design / Development |
| 0.5 | 0.5 | | | Test |
| 0.4 | 0.4 | | | Maintenance / Support |
| 0.5 | 0.5 | | | Integration |
| 0.6 | 0.6 | | | Prog. Language - C |
| 0.5 | 0.5 | | | Prog. Language - C++ |
| 0.5 | 0.5 | | | Prog. Language - Java |
| 0.5 | 0.5 | | | OS - Windows |
| 0.6 | 0.6 | | | OS - Linux |
| 0.6 | 0.6 | | | OS - AIX |
| 0.6 | 0.6 | | | Language - English |
| 0.5 | 0.5 | | | Language - Chinese |
| 0.5 | 0.5 | | | Language - Japanese |
| | | | | Overall Marketplace |
| 0 | 0 | 0 | | WW Market Opportunity |
| 0 | 0 | 0 | | WW CGR |
| 0.2 | 0.2 | 0.1 | | WW Market Share |
| | | | | Geography Marketplace |
| 0.2 | 0.6 | 0 | | Market Opportunity |
| 0.2 | 0.6 | 0 | | Market CGR |
| 0 | 0.9 | 0.1 | | Market Share |
| | | | | Geography Environment |
| 0 | 0.1 | 0.7 | 731 | Personnel Cost |
| 0 | 0.1 | 0.7 | | General Business Cost |
| 0.1 | 0.1 | -0.7 | 732 | Attrition (1=Highest) |
| 0.4 | 0.4 | 0.5 | | Growth Rate |
| | | | | Product Sales / Delivery |
| 0.4 | 0.6 | -0.3 | | Share Integration, Support, and Sales Force |
| 0.6 | 0.4 | 0.8 | | Share Business Partners |
| 0.7 | 0.5 | 0.8 | | Share Spiral Partners |
| | | | | Competitors Strength |
| 740 -0.3 | -0.3 | -0.2 | | WW |
| 750 -0.7 | -0.7 | -0.3 | | In Geography Market |
| 0.5 | 0.5 | 0.3 | | Ingrained in competitive technology |

FIG. 9

| 900 Geo. Profile A | Geo. 910 Profile B | Local Skills |
|---|---|---|
| 3 | 2 | Design / Development |
| 5 | 3 | Test |
| 4 | 2 | Maintenance / Support |
| 3 | 1 | Integration |
| 4 | 2 | Prog. Language - C |
| 4 | 2 | Prog. Language - C++ |
| 3 | 4 | Prog. Language - Java |
| 3 | 2 | OS - Windows |
| 901 [ 3 | 3 ] 911 | OS - Linux |
| 3 | 3 | OS - AIX |
| 3 | 2 | Language - English |
| 5 | 2 | Language - Chinese |
| 1 | 5 | Language - Japanese |

Overall Marketplace
    WW Market Opportunity
    WW CGR
    WW Market Share

Geography Marketplace

| | | |
|---|---|---|
| 902  5 | 4 | Market Opportunity |
| 5 | 4 | Market CGR |
| 2 | 2 | Market Share |

Geography Environment

| | | |
|---|---|---|
| 2 | 2 | Personnel Cost |
| 3 | 3 | General Business Cost |
| 2 | 3 | Attrition (1=Highest) |
| 5 | 5 | Growth Rate |

Product Sales / Delivery

| | | |
|---|---|---|
| 5 | 2 | Share Integration, Support, and Sales Force |
| 1 | 3 | Share Business Partners |
| 1 | 2 | Share Spiral Partners |

Competitors Strength
    WW

| | | |
|---|---|---|
| 903  1 | 4  913 | In Geography Market |
| 3 | 3 | Ingrained in competitive technology |

FIG. 10A

1000 1010
Skills Gap

1100 1110
Opportunity Gap

| 1020 Score A | 1030 Score B | 1040 Score A | 1050 Score B | 1060 Score A | 1070 Score B |
|---|---|---|---|---|---|
| 1.5 | 1 | 1.5 | 1 | 0 | 0 |
| 2 | 2 | 2 | 2 | 0 | 0 |
| 2.5 | 2 | 2.5 | 2 | 0 | 0 |
| 3 | 2.4 | 3 | 2.4 | 0 | 0 |
| 2.5 | 2.5 | 2.5 | 2.5 | 0 | 0 |
| 2.5 | 2.5 | 2.5 | 2.5 | 0 | 0 |
| 1.5 | 2 | 1.5 | 2 | 0 | 0 |
| 1.8 | 1.2 | 1.8 | 1.2 | 0 | 0 |
| 1.8 | 1.8 | 1.8 | 1.8 | 0 | 0 |
| 3 | 3 | 3 | 3 | 0 | 0 |
| 1.5 | 1 | 1.5 | 1 | 0 | 0 |
| 2.5 | 2.5 | 2.5 | 2.5 | 0 | 0 |
| 2.5 | 2.5 | 2.5 | 2.5 | 0 | 0 |
| Subtotal 28.60 | 26.40 | 28.60 | 26.40 | 0.00 1080 | 0.00 1090 |
| Normalized 2.20 | 2.03 | 2.20 | 2.03 | 0.00 | 0.00 |

FIG. 10D

| | 1120 | 1130 | 1140 | 1150 | 1160 | 1170 |
|---|---|---|---|---|---|---|
| | 1 | 0.8 | 3 | 2.4 | 0 | 0 |
| | 1 | 0.8 | 3 | 2.4 | 0 | 0 |
| | 0 | 0 | 1.8 | 1.8 | 0.2 | 0.2 |
| Subtotal | 2.0 | 1.6 | 7.8 | 6.6 | 0.2 | 0.2 |
| Normalized | 0.67 | 0.53 | 2.60 | 2.20 | 0.07 | 0.07 |
| | 0 | 0 | 0.2 | 0.2 | 1.4 | 1.4 |
| | 0 | 0 | 0.3 | 0.3 | 2.1 | 2.1 |
| | 0.2 | 0.3 | 0.2 | 0.3 | -1.4 | -2.1 |
| | 2 | 2 | 2 | 2 | 2.5 | 2.5 |
| Subtotal | 2.2 | 2.3 | 2.7 | 2.8 | 4.6 | 3.9 |
| Normalized | 0.55 | 0.58 | 0.68 | 0.70 | 1.15 | 0.98 |
| | 2 | 2 | 3 | 3 | -1.5 | -1.5 |
| | 1.8 | 3 | 1.2 | 2 | 2.4 | 4 |
| | 2.8 | 3.5 | 2 | 2.5 | 3.2 | 4 |
| Subtotal | 6.6 | 8.5 | 6.2 | 7.5 | 4.1 | 6.5 |
| Normalized | 2.20 | 2.83 | 2.07 | 2.50 | 1.37 | 2.17 |
| | 1.4 | -0.7 | 1.4 | -0.7 | 0.6 | -0.3 |
| | 1.5 | 1.5 | 1.5 | 1.5 | 0.9 | 0.9 |
| | 2.9 | 0.8 | 2.9 | 0.8 | 1.5 | 0.6 |
| Subtotal | | | | | | |
| Normalized | 1.45 | 0.4 | 1.45 | 0.4 | 0.75 | 0.3 |

MARKET EXPANSION THROUGH OPTIMIZED RESOURCE PLACEMENT

BACKGROUND OF THE INVENTION

1. Field of the Invention

The present invention relates to expanding markets for products and services by making resource placement decisions in an objective manner, and deals more particularly with techniques for comparing one or more locations to a set of criteria that are directed toward identifying market strengths and weaknesses of the location(s) as part of an overall value chain.

2. Description of the Related Art

Many countries or localities represent an untapped or an emerging market for the sale and adoption of information technology ("IT"). Often, these same countries are simultaneously experiencing a high growth rate in the availability of skills supportive of IT. Connections between a company's business and marketing strategy (and its related decisions) and its resource placement strategy (and its related decisions) may be revealed by examining and understanding the value chain in which the company participates.

A value chain is defined as a sequence or network of transactions and mutually-beneficial relationships occurring between companies in the delivery of value to an end customer. Value chains have also been referred to as supply chains and value nets. Economists as far back as Adam Smith have described in great detail how value chains work, especially with regard to how such chains allow for and encourage specialization of business roles, and how they also drive more responsive business systems over time.

As an example, consider a simple value chain that corresponds to a hardware supply chain, wherein a wholesale hardware manufacturer supplies a hardware product directly to a retailer who in turn sells it to an end customer. The hardware manufacturer receives value from the retailer because the retailer enables the manufacturer's products to reach the marketplace; this link in the value chain provided by the retailer supports and sustains further orders for the products provided by the manufacturer, thereby causing an increase not only in the manufacturer's revenue but also in the revenue of the retailer. The retailer receives value from the hardware manufacturer in terms of obtaining products that will meet needs of customers in this marketplace. The end customer receives value from the retailer, who provides the customer with an opportunity to buy the needed product, and in turn, the retailer receives value from the customer from the sale of the products. Other benefits may also result, such as increased market presence or brand awareness, and so forth. Symbiotic relationships thus exist between entities in the value chain.

More complicated value chains, which may be recursive in some cases, are seen in the IT field. FIG. 1 illustrates representative entities in a sample IT-related value chain. A plurality of components 110 may be required in this particular chain, for example, and these components may be adapted for use with a plurality of operating systems 120. In the more general case, a number of entities (see, for example, reference number 130 in FIG. 1) may be involved in creating one or more IT solutions 140, which may be marketed through one or more distribution channels 150.

With these simple examples, it should be clear how companies become part of a value chain and also how they become dependent on both the upstream and downstream vitality and growth of other links in the chain. No company in a mature and free market is likely to own the entire chain of value. In fact, economists use the complexity of a value chain as one indicator of a market's (and a country's) economic maturity. It therefore follows that a company's ability to expand its market presence by delivering value to emerging and immature markets is influenced and limited by its ability to develop a rich and differentiated value net within these emerging markets.

Accordingly, it is desirable to provide techniques that leverage a value chain analysis approach for determining optimal resource placement, particularly in emerging IT markets.

SUMMARY OF THE INVENTION

An object of the present invention is to provide techniques for leveraging a value chain analysis approach to determine optimal resource placement in order to expand markets.

Another object of the present invention is to provide techniques for determining optimal resource placement in emerging IT markets.

A further object of the present invention is to make resource placement decisions using objective criteria.

Another object of the present invention is to provide techniques for determining optimal resource placement decisions using business growth and marketing, rather than purely cost-oriented, objectives.

Yet another object of the present invention is to objectively select among a plurality of candidate locations for resource placement.

Another object of the present invention is to provide techniques for comparing labor localities using cost as well as marketing/growth criteria and objectives.

A further object of the present invention is to provide techniques for presenting resource placement decision factors in a manner that improves acceptance and understanding of the placement decision by the overall work force and the marketplace.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, embodiments of the present invention may be provided as methods, systems, and/or computer program products. In one aspect, preferred embodiments comprise determining a company's business objectives, preferably in terms of candidate locations; developing objective measurements for those business objectives; performing value chain analyses for products/services to be provided by the company; deciding what types of human resources may improve the value chain; estimating and accounting for lag time characteristics, if any, that may be found in the value chain; developing cost factors, and bounds or limits on those factors, as appropriate; performing analyses that use the marketing factors as well as the cost factors; and assigning the human resources accordingly.

This aspect is illustrative, but not limiting, of the scope of the present invention.

The present invention may also be used advantageously in methods of doing business. For example, a company may provide a service for assessing products and candidate locations, thereby suggesting where the client should place its human resources. As another example, a company may implement a service whereby another company's resource placement decisions can be validated prior to implementation. When provided for a fee, a service of either type may be provided under various revenue models, such as pay-per-use billing, a subscription service, monthly or other periodic billing, and so forth.

The present invention will now be described with reference to the following drawings, in which like reference numbers denote the same element throughout.

BRIEF DESCRIPTION OF THE DRAWINGS

FIG. 5 provides an example showing how objective measurements for a particular criterion may be defined;

FIG. 6 depicts sample values of a product profile, and FIG. 9 depicts sample values of two geography profiles, where these profiles are illustrative of those created according to preferred embodiments of the invention;

FIG. 7 contains a set of sample correlator values of the type that may be used for weighting computations carried out during a resource placement determination; and FIG. 10 (comprising FIGS. 10A-10E) provides sample scores that are illustrative of the types of scores that may be computed, using preferred embodiments of the present invention, to objectively analyze candidate locations for resource placement.

DESCRIPTION OF PREFERRED EMBODIMENTS

Building a market presence and base of skills in an emerging market is important, especially for products and services which move through a complex value chain, such as IT products. Having such a presence in an emerging market provides many advantages. It provides pragmatic information and insight into the business problems occurring within a target market. It also provides language skills, and serves to initiate useful and financially profitable two-way relationships with local businesses and business partners. Techniques for pursuing marketing objectives, supported in part by labor placement and sourcing decisions, would allow a business to pursue its overall business strategy in a more balanced and integrated manner.

Management decisions regarding the placement and sourcing of labor resources (referred to hereinafter as resource placement or labor placement decisions) have traditionally and largely hinged on lowering employee-related expenses. Recent trends in placing work in other countries, sometimes called "off-shoring," reveal a similar focus on the expense side of the balance sheet. Yet such a cost-centered approach in handling employee-related decisions misses a broader, more value-laden, and more integrated approach in executing a company's overall business strategy—one in which marketing and growth objectives of the company are primary, with cost and expense objectives being of lesser importance in labor placement decisions.

Figure 1:
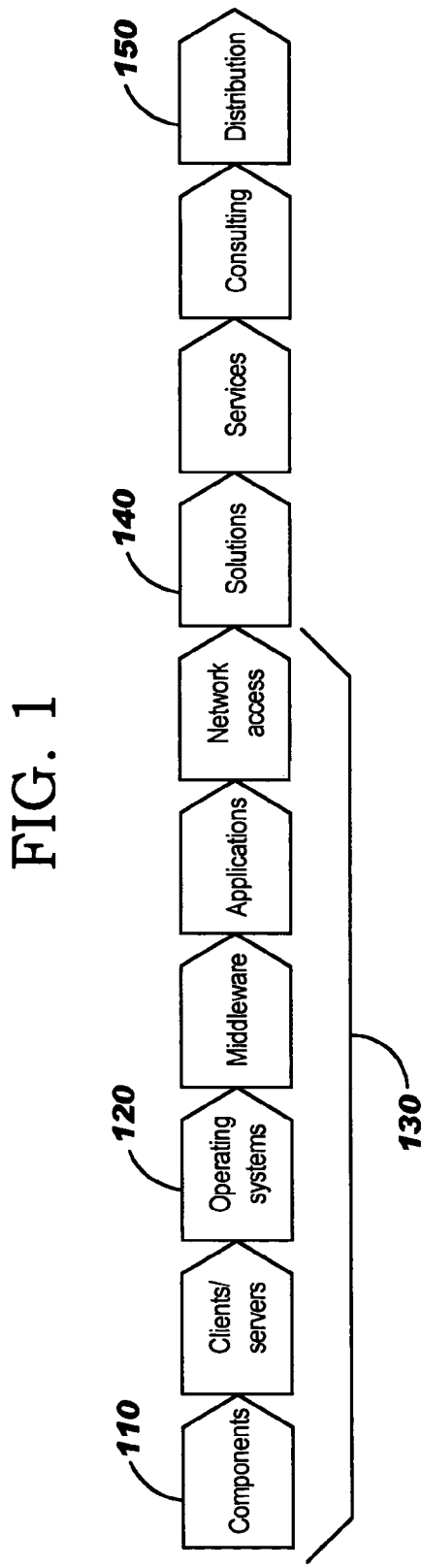
FIG. 1 illustrates entities in a sample value chain for IT products.

Value chains were discussed above, and a sample IT value chain was depicted in FIG. 1. In the same manner and for the same general reasons that businesses are considered integral links in a value chain, employees may also be considered as part of a large value chain. For example, each employee enables (to a greater or lesser extent, depending on their location in a value chain) other employees in the value chain. Their skills and specialties allow other employees in the chain to in turn specialize and to provide incremental and unique value to the chain.

Some employees, based on the skills they provide to the chain of value, enable other links and even other value chains to exist. For example, a software developer can support other links in the value chain by not only directly contributing a software product or components thereof, but also by serving the sales force during technical discussions with a customer. Moreover, that same developer can also provide other developers in other companies (e.g., independent software vendors or "ISVs", systems integrators, etc.) with instruction, consulting, or with programming assets in order to take advantage of the developer's software. In this way, one link in the chain supports others in the chain.

In the case where development resources are company employees, benefits in the value chain exist by exploiting or leveraging the employees' influence in such areas as technical instruction (by formal and/or informal means), writing technical articles or white papers, mentoring, providing a local knowledge source, consulting with customers, and so forth—all in conjunction with benefits contributed by those in sales, marketing, and/or system integration roles. If software products are delivered via business partners, then the same software developer influences are available, and a company may benefit by achieving even tighter linkages with the business partner. For example, the company may leverage the business partner to not only perform development work for the company but to also provide other functions such as technical sales or pre-sales support, marketing, and/or installation activities that take advantage of the skills gained by the business partner, thereby augmenting capabilities of the company's own employees. The term "spiral partners" is used herein when referring to this special type of business partner. It can be especially valuable to train spiral partners in a company's products by engaging with them in a vendor relationship to build skills that may contribute, in this manner, to aspects of the company's business beyond the initial delivery of the product. As a result, the skills base of the vendor may thereby expand and support additional needs that exist within the value chain (e.g., supporting needs and activities that are "downstream", in terms of the value chain, of the product development effort).

In contrast, there are other employees and jobs, generally near the end of the value chain, which provide little additional enabling value to the chain (e.g., call center and service representatives). Employees in these jobs still provide irreplaceable value to the chain, but they typically have little ability to enlarge the chain beyond their immediate contribution.

Understanding where companies and their employees sit in a value chain is important to making resource placement decisions, and as disclosed herein, those decisions are preferably made by coupling human resource placement decisions to current and future growth and marketing objectives. In so doing, a company can develop a more optimal, balanced, and more growth-oriented resource placement strategy. The desired effect and focus of such employment decisions are preferably based on market share expansion and/or other types of growth opportunities and, in contrast to prior art techniques, are no longer merely determined by cost factors.

Decisions about where to locate a company's labor force may be influenced by a number of related factors, including (but not limited to) the availability of a skilled labor force, government regulations and incentives, tax laws, education levels of the labor pool, language fluency, relative cost of living, ease of access, maturity of the distribution system, the cost of capital, labor cost, and/or labor attrition. These factors typically vary by country and also generally vary over time. In addition, market factors may also be considered in the labor placement decision. Examples of these market factors include (but are not limited to) the presence of suppliers, the presence of competitors, and/or the maturity of the market for a company's products.

Preferred embodiments of the present invention determine optimal resource placement using results from a value chain analysis, objectively analyzing candidate locations by considering a company's market and revenue objectives in addition to using standard cost-oriented decision criteria. Labor placement decisions thus directly support market expansion objectives rather than mere labor expense objectives. Further, these placement decisions are based on the maturity, complexity, and overall strength of the value chain in the emerging markets, both in terms of employee skill base and the presence of ready business partners.

Figure 2:
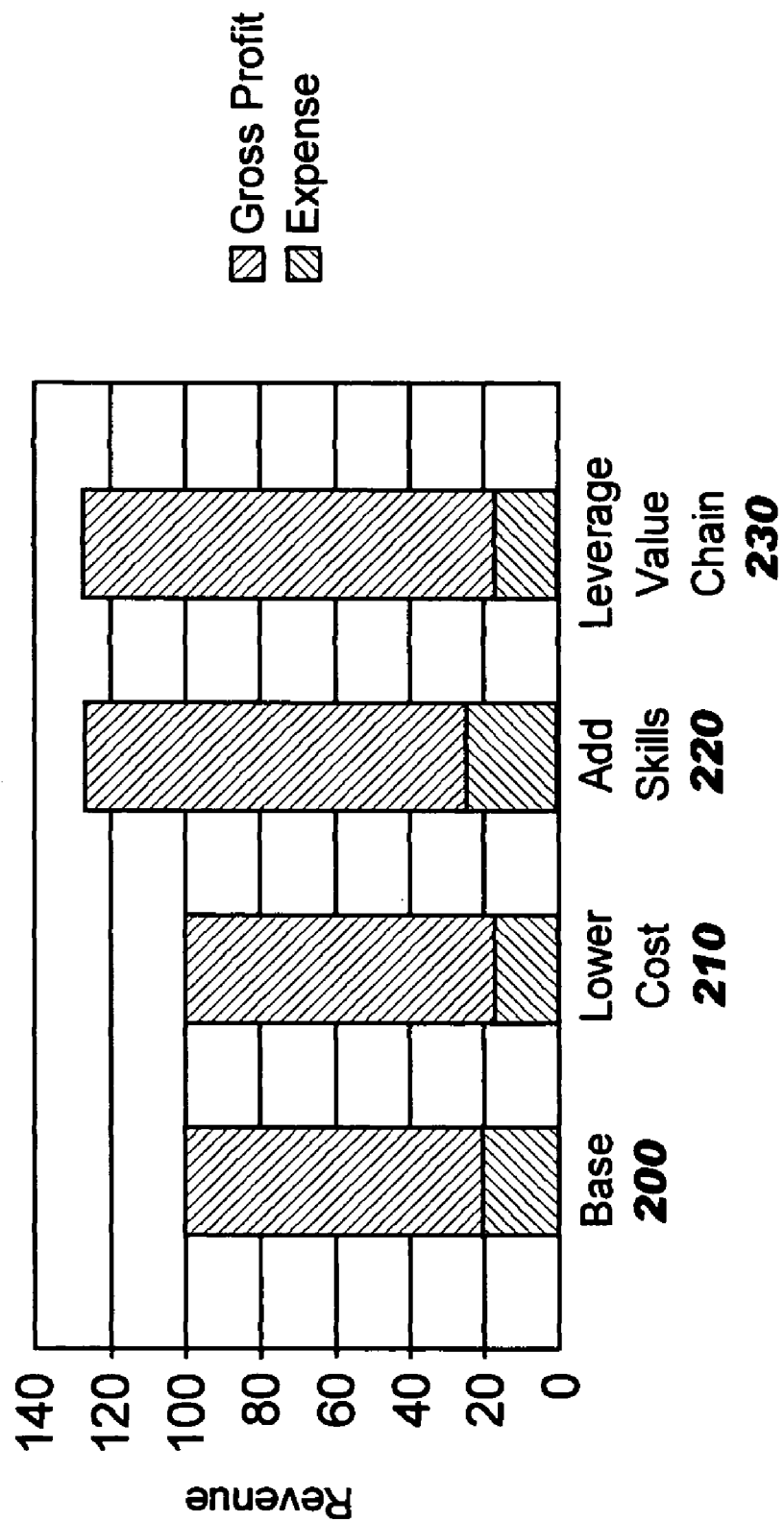
FIG. 2 depicts various techniques for increasing a product's gross profits.

This market approach is in contrast to prior art techniques for base resource placement decisions, which do not consider an overall value chain but instead are focused primarily on reducing labor costs. See FIG. 2, where techniques for increasing a product's gross profits are illustrated graphically. As shown therein at reference number 200, a sample product "X" may have a certain base cost or expense and a certain base revenue, and subtracting the cost from the revenue yields the gross profit for product "X". Lowering the product's expenses, as illustrated as 210, does not increase revenue. Thus, the gross profit is increased only to the extent that the costs can be decreased. Alternatively, efforts can be directed toward adding selected skills to areas of a company or value net that is producing or delivering product "X". For example, additional sales staff can be added to increase revenue. This approach, however, necessarily increases cost, as shown at 220. As will be obvious, to increase gross profit when using this approach, the increase in revenue generated by the added skills must exceed the increase to the product's cost. Reference number 230 illustrates the approach used by embodiments of the present invention, where a value chain is improved by leveraging resources in an optimized manner. A goal of this approach is to increase revenue and to reduce costs at the same time, providing a double benefit to gross profits. The behaviors illustrated at 230 are particularly likely to result in appropriately-selected emerging markets because the value chains are less mature and the competitive forces are less well-tuned and arrayed.

According to preferred embodiments, a value chain analysis is built using a set of business and marketing objectives. The particular objectives to be used in an assessment are preferably specific to each value chain, although certain criteria may apply generally to a broad spectrum of analysis efforts. In preferred embodiments, criteria-specific weightings may be applied in order to account for nuances of a particular value chain. For example, cost factors of placing resources in a location may be weighted in light of market and growth opportunities that exist for a company's products in a target location or area (referred to herein generally as a location). And, more than one candidate location may be evaluated for a particular resource placement decision, such that an objective selection can be made among the candidates. (It should be noted that while discussions herein are primarily in terms of resource placement for software products, the disclosed techniques may also be used advantageously with other types of products as well as with services and with combinations of products and services.)

Accordingly, a primary goal of an assessment conducted using techniques of the present invention is to provide a recommendation on where to locate which types of labor and in what quantities. A complementary goal is to improve a company's business position by focusing on any gaps or shortfalls that may be present in the value chain at the candidate locations. Location-specific scores are computed to assist in reaching these goals, as will now be described with reference to FIGS. 3-10.

Figure 3:
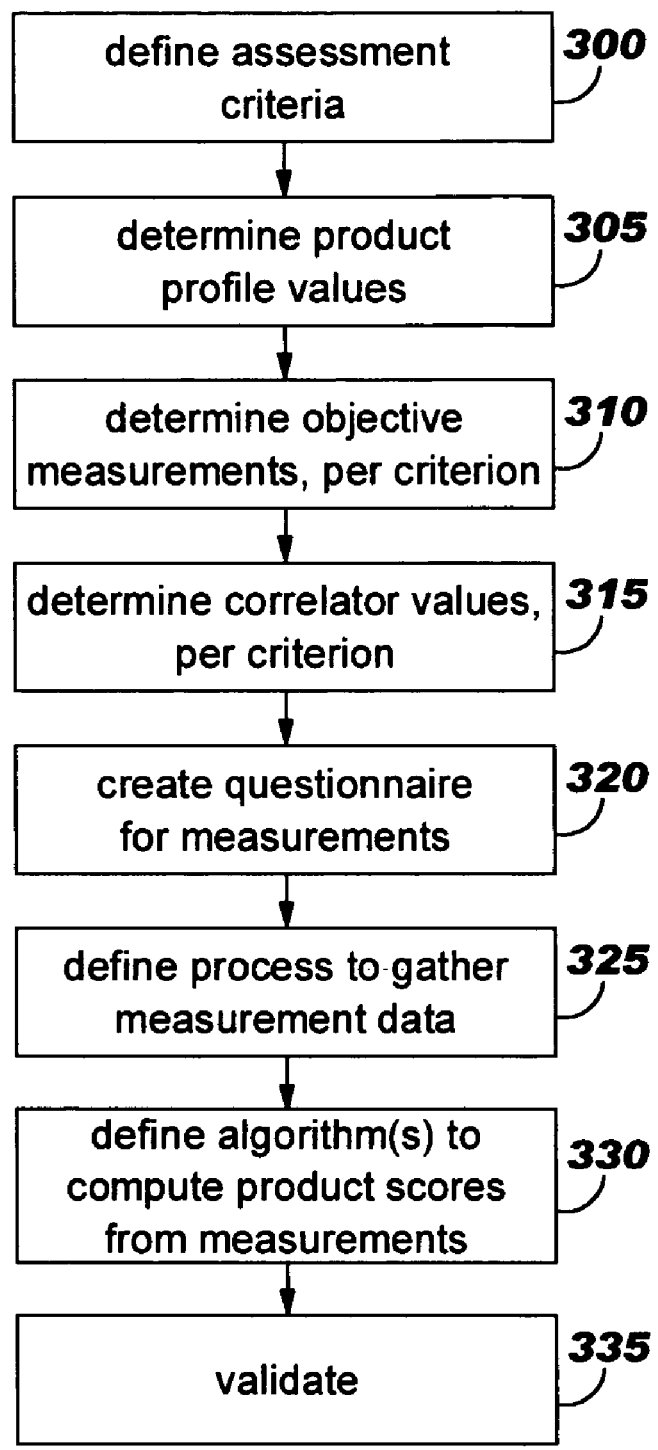
FIGS. 3 and 8 provide flowcharts depicting actions that are preferably carried out when using preferred embodiments of the present invention.

FIG. 3 provides a flowchart that illustrates, at a high level, actions that are preferably carried out when establishing an assessment process according to preferred embodiments. At Block 300, a set of assessment criteria are determined. These criteria will be used when gathering input for the resource placement decision. Preferably, the criteria comprise factors that affect linkages in the value chain and are instrumental in influencing—for a specific product, product family, or brand for which a placement decision is being analyzed—the desirability of each candidate location. (References herein to evaluating a product are intended to include evaluations of products or services comprising a family or brand.)

Objective measurements for the criteria are defined (as discussed in more detail with reference to Block 310, below). Preferred embodiments strive to eliminate subjectivity, and these objective measurements are key to accomplishing that goal. In preferred embodiments, each criterion will be rated with a numeric value to reflect how well a candidate location meets that criterion, using the objective measurements. The numeric value is preferably selected from a predetermined range, and is subsequently provided as input to an algorithm (or algorithms) that generates scores for ranking the candidate locations. Preferably, a range of 1 to 5 is used for measuring each of the criteria. In the examples used herein, a value of 5 indicates the best case, and 1 represents the worst case.

The relative importance to the product under evaluation, or the relative significance or strength, of appropriate ones of the criteria is preferably determined (Block 305), and a numeric value is preferably assigned accordingly, thereby forming what is referred to herein as a "product profile". In preferred embodiments, a range of 1 to 5 is used, where 5 indicates a criterion that is extremely important to this product and 1 indicates a criterion that is of very little importance. (The "appropriate ones" of the criteria are discussed in more detail with reference to the sample product profile in FIG. 6.) In practice, a multiple-choice entry technique (such as a graphical user interface representation having selectable radio buttons) is preferably provided for entry of the values in the product profile.

In Block 310, objective measurements for each criterion are determined, as discussed above. In preferred embodiments, ensuring that the measurements will be objective is facilitated by developing textual descriptions for each numeric value in the selectable range. These textual descriptions are designed to assist candidate location assessors in performing an objective, rather than subjective, assessment. Preferably, the textual descriptions are defined so that a criterion will be assigned a score of 3 if the candidate location meets requirements for that criterion, a score of 4 if the product exceeds requirements, and a score of 5 if the product significantly exceeds requirements. On the other hand, the descriptions preferably indicate that a candidate location that has minor deviations from the requirements of a criterion (but fails to completely meet requirements) will receive a score of 2 for that criterion, and a candidate location that has significant deviations from the requirements for the criterion will receive a score of 1. Assigning the values, based on these objective measurements, occurs during an assessment of candidate locations, as discussed below with reference to FIG. 8, and the set of values assigned to each candidate location are referred to herein as a "geography profile".

One or more correlators may be defined (Block 315), where each correlator serves as a weight in an algorithm or algorithms, enabling each measurement criterion to have a variable influence on the score or scores that will be computed when evaluating candidate locations. Preferably, correlators are defined in terms of the business objectives that are important to the company seeking to make a resource placement decision. (Accordingly, the sample data in FIG. 7 illustrates use of market share, revenue, and cost reduction as example business objectives for which correlators are defined.) In the examples provided herein, correlators are defined as values between +1.0 and −1.0, and are separately assigned for market share, revenue, and cost reduction. Use of correlators is discussed in more detail below, with reference to FIG. 7. The manner in which the individual correlator values are chosen does not form part of the present invention, and an iterative approach may be used if desired. By appropriate selection of the product profile values and correlators, the location-specific resource placement scores determined during the assessment process can be tuned to more precisely reflect the requirements of the evaluated product.

Block 320 indicates that a questionnaire is preferably developed for use when gathering data for the candidate locations. A written questionnaire may be used to solicit information that will subsequently be provided as input to an algorithm or algorithms; alternatively, information may be submitted directly into an electronic questionnaire. In preferred embodiments, the electronic questionnaire corresponds to a spreadsheet or other type of automated data entry mechanism (such as a prompting wizard application that will lead a user through entry of information) that can both receive inputs and apply algorithmic manipulations to the entered data to create scores or rankings for the candidate locations. (Or, separate programmatic means may be used for entering the data and for applying the algorithmic manipulations, without deviating from the scope of the present invention.) See the discussion of FIG. 8, below, for more information regarding how the location-specific information is used.

A process may be defined (Block 325) for gathering the measurement data that will be used in the assessment. This may further comprise identifying sources of relevant information for each candidate location, such as census data or other government reports describing the available labor pool in that location.

One or more algorithms or computational steps are preferably defined (Block 330) to use the measurement data for computing one or more location-specific scores for resource placement. As noted above, preferred embodiments encapsulate the algorithm(s) in a spreadsheet or other automated technique.

Optionally, one or more trial assessments may then be conducted (Block 335) to validate the criteria, weights, measurements, and/or algorithms. For example, one or more existing products for which a resource placement decision has already been made may be assessed, and the results thereof may be analyzed to determine whether an appropriate set of factors has been put in place. If necessary, adjustments may be made, and the process of FIG. 3 may be repeated.

Figure 4:
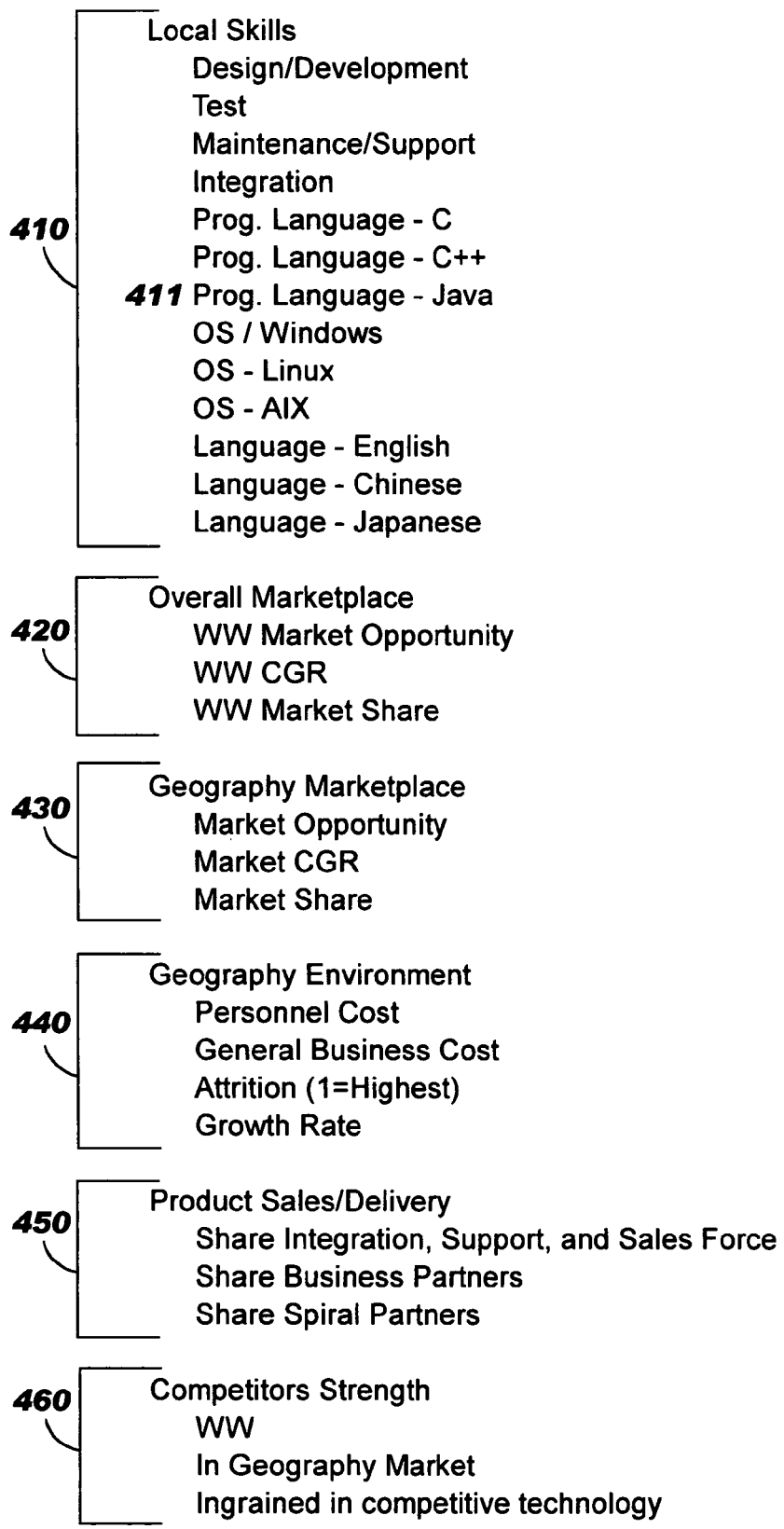
FIG. 4 depicts sample assessment criteria for a hypothetical product for which a resource placement decision is to be made.
Figure 8:
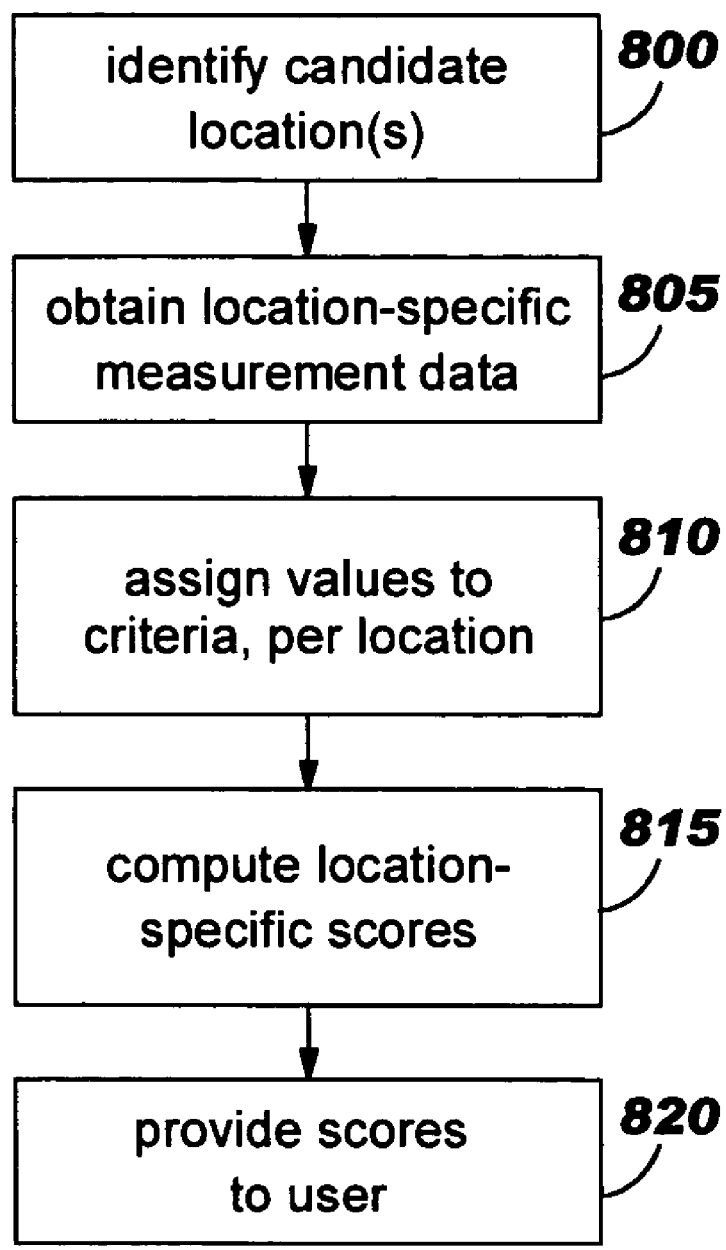

By way of example, sample criteria 400 for a hypothetical product are shown in FIG. 4. A set of skills 410 which are deemed to be important for this product are enumerated. As shown in the example, the evaluation of local skills needs to address the following criteria: design/development skills; test (i.e., product debugging) skills; maintenance/support skills; skills in programming languages (and in particular, skills in C, C++, and Java™ programming languages); ability to use several operating systems (and in particular, Windows®, Linux®, and AIX® operating systems); and language fluency in English, Chinese, and Japanese. ("Windows" is a registered trademark of Microsoft Corporation in the United States, other countries, or both; "Linux" is a registered trademark of Linus Torvalds in the United States, other countries, or both; and "AIX" is a registered trademark of International Business Machines Corporation in the United States, other countries, or both.) So, for example, if availability of design/development skills is extremely important to this product, then a value of 5 would be assigned to this criterion in the product profile, and if a candidate location significantly exceeds the requirements for design/development skills, then that location would be assigned a value of 5 in its geography profile for purposes of the assessment. (FIG. 8 provides sample values for geography profiles of two hypothetical candidate locations.)

Returning briefly to the topic of value chains, when placing resources in an emerging market, it is important to ensure that those resources reflect the right set of skills at the right time in the right order, thereby enabling the value chain to function and mature in an optimal manner. For example, rather than placing only a group of software developers into an emerging market, linkages in the value chain can often be strengthened by placing employees in other job categories within the value chain—such as software testers, maintenance/support personnel, and software integrators—in that location as well. The software developers, as an example, may be able to perform better if they are located relatively near the software testers. Similarly, the software testers may perform better if they are located relatively near the software developers, and so forth. Accordingly, the assessment criteria shown in the example (see reference number 410) include different types of job categories, and by considering each of the included job categories when assessing each candidate location, costs and benefits of placing resources can be assessed in terms of the overall value chain. This is in contrast to making resource placement decisions by considering costs of the various job categories in isolation, as is typically done in the prior art. (As will be obvious, the job categories to be included in a particular assessment may vary, and therefore the categories shown at 410 are by way of illustration only.)

Turning again to FIG. 4, reference number 420 identifies a set of criteria that pertains to economic data of the overall marketplace, and reference 430 identifies corresponding criteria that pertain to the candidate locations (where the term "geography" is used in FIG. 4 to refer to a candidate location). In this example, the economic data of importance comprises the worldwide ("WW") market opportunity for the product; the worldwide compound growth rate ("CGR"); and the worldwide market share for the product, as well as corresponding location-specific values thereof. If the product opportunity is significant on a worldwide basis, or perhaps significantly exceeds the opportunity for other potential products, then a value of 5 would be used in the product profile. And, if the product opportunity in a particular location is very low or insignificant, then a value of 1 would be used in the geography profile for that location.

Environmental information pertaining to the locations is represented at reference number 440, and in this example, includes personnel cost (which preferably covers salary, training, benefits, and so forth); general business cost (which preferably includes any required taxes that must be paid in this location, costs of dealing with applicable regulations and laws, and other required overhead expenditures); an estimate of the expected degree of attrition in the labor pool in this location; and the growth rate in applicable skills. As noted in the commentary in FIG. 4, a value of 1 should be assigned in the geography profile if expected attrition is high, thereby effectively disfavoring this location; by contrast, a value of 5 should be assigned if expected attrition is low. Factors such as the number of college graduates per year who have relevant skills may be factored into the location-specific value assigned to the environmental growth rate when constructing a geography profile.

Criteria for product sales and delivery are specified at 450. In this example, the criteria pertain to identifying the means by which the company seeking to place its labor resources delivers product to the end customer in the selected location, utilizing the following: direct product integration, support, and sales force; via business partners; and via spiral partners, which were discussed above. Recognizing how the product is delivered can be important in determining where to strengthen the linkages in the value chain.

Finally, a set of sample criteria 460 is included that pertains to products that compete with the product for which a resource placement decision is to be made. In this example, the worldwide strength of the competition and the strength within each geography is to be measured, along with the degree to which the local labor pool is already ingrained in competing technology.

As will be obvious, additional and/or different criterion may be used, and embodiments using different criteria are considered to be within the scope of the present invention.

An example showing how objective measurements for a particular criterion may be defined is provided in FIG. 5. This example 500 corresponds to the criterion shown at reference number 411 of FIG. 4; see reference number 510, where the descriptive text associated with the criterion has been entered. In this example, additional text is provided at 520 to clarify the purpose of this criterion, and a set of one or more points to be considered when evaluating how well a candidate location meets requirements for this criterion is provided at 530. Measurement guidelines 540 are provided, stating the 5 possible values for each criterion along with text explaining how to select among the values. It is to be understood that the information in FIG. 5 is merely illustrative, and other approaches may be used without deviating from the scope of the present invention. As one example, the information shown at 530 might be further defined in terms of the values. That is, rather than setting out a set of general guidelines, as illustrated, a specification might be provided such as "Assign a value of 1 if Java programming skills are not available; assign a value of 2 if Java programming skills are available to a limited degree; . . . ".

Preferably, information of the type shown in FIG. 5 is readily available to assist users during an evaluation. Help information may be generated from information illustrated for the definition 520, information required 530, and/or measurement guidelines 540. Or, a user interface display might (for example) present the items from information required 530, along with radio buttons or checkboxes that can be activated by the user to indicate how well the candidate location meets these objectives. (The user may be allowed to directly enter numeric values that will be used during an assessment, or the numeric values may be programmatically generated based on selections the user makes. For example, if a user is presented with checkboxes for the 7 items shown at reference number 530 of the sample data, but is unable to check any of those boxes as being met for a candidate location, then underlying logic may assign a value of 1 for this criterion, indicating that the location deviates significantly from the required skills.)

FIG. 6 shows values for a sample product profile, using the sample criteria from FIG. 4. (Note that profile values are not deemed appropriate for the criteria which are generally categorized as geography marketplace 430 and geography environment 440.) As can be seen from the sample product profile 600, availability of design/development skills 601 and fluency in English 602 are both assigned a value of 5, indicating that these criteria are considered to be extremely important to this hypothetical product. On the other hand, language fluency in Chinese and Japanese is considered unimportant to this product; see reference number 603.

Sample correlator values 700 are provided in FIG. 7, and are presented alongside the corresponding criteria from FIG. 4. As noted above, correlators ranging between +1.0 and −1.0 are used as weights in preferred embodiments, and as shown in FIG. 7, correlator values are provided (by way of example) for revenue, market share, and reducing overall cost. Correlator values are used, in combination with values from the product profile and geography profile, to create numeric values that factor into the candidate location scores. In preferred embodiments, at least one correlator must be defined for each criteria. A negative number indicates an inverse correlation (i.e., one that negatively affects the desired output value) and a positive number indicates a positive correlation (i.e., one that positively affects the desired output value). A very strong correlation would have a value approaching 1.0, whereas a very weak correlation might have a value of 0.1, no correlation would have a value of 0, and so forth.

Note that a negative correlator number is used in the examples for the criterion pertaining to strength of the company's competition in market share and revenue, as shown in rows 740 and 750 of FIG. 7, such that the assessment computations used in preferred embodiments generate a higher positive score in locations where the competitor does poorly. This positive score will therefore aid in favoring this candidate location over one where the competitor is entrenched.

Note also that a relatively high negative correlator has been assigned to attrition, as it pertains to a company's cost reduction goals. See reference number 732. This indicates that attrition has a large negative impact on ability to reduce costs, and a candidate location having a high value in its geography profile for the attrition criterion will therefore receive a lowered score when the (negative) result of multiplying the cost reduction correlator by the attrition value is factored into subsequent computations.

Once the information discussed with reference to the flowchart in FIG. 3 (and illustrated by FIGS. 4-7) has been obtained, it is then combined with location-specific information to generate the resource placement scores. This juxtaposition is depicted in the flowchart of FIG. 8. In Block 800, the candidate location or locations are identified. Relevant information for those locations is gathered (Block 805) or otherwise obtained, preferably by consulting sources identified during the processing of Block 325 of FIG. 3. Using that information, values are assigned to the criteria (except, in preferred embodiments, for those criteria that pertain to the product on a worldwide basis) for each candidate location at Block 810, thereby forming location-specific geography profiles. As discussed above, a value of 1 to 5 is assigned, in preferred embodiments, to indicate how well that particular candidate location does regarding each of the appropriate criteria. Preferably, the objective measurement information created at Block 310 of FIG. 3 (an example of which is shown at reference numbers 530 and 540 in FIG. 5) is used during Block 810 when selecting each value, and data entry techniques such as selectable radio buttons numbered 1 through 5 may be provided.

At this point, preferred embodiments have the input data that is needed by the algorithm(s), and computations are then performed (Block 815) to create the location-specific scores. These scores are then provided to the user (Block 820), for example by displaying values on a graphical display and/or printing a report that contains this information.

FIG. 9 illustrates two sample geography profiles 900, 910, and shows how the values therein relate to the corresponding assessment criteria provided in FIG. 4. Values used to create these profiles 900, 910 are provided at Block 810 of FIG. 8. As shown by the example in FIG. 9, the two hypothetical candidate locations are considered equal in terms of the availability of skills pertaining to the Linux and AIX operating systems (see reference numbers 901 and 911), while pronounced differences are found in other criteria such as the strength of the competition in each location (see reference numbers 903 and 913).

A number of different scores may be computed based on the product profile, geography profiles, and correlators. (Alternative embodiments of the present invention may omit use of correlators, without deviating from the inventive concepts disclosed herein.) Scores computed in preferred embodiments will now be described with reference to the example values shown in FIGS. 10A-10E.

In FIG. 10A, a per-location score referred to herein as a "skills gap'" score is illustrated. In preferred embodiments, a set of skill gap numbers is computed by subtracting each geography profile value from the corresponding product profile value for each criteria that pertains to local skills (where local skills criteria are shown, by way of example, at reference number 410 in FIG. 4). Column 1000 in FIG. 10A shows the individual skill gap numbers for the candidate location "A" and column 1010 shows the numbers for candidate location "B". Note that if there is no gap for a particular one of the criteria (i.e., the subtraction operation is not a positive number), its skill gap number is set to 0 in preferred embodiments. For example, geography profile 900 of FIG. 9 indicates that test skills and Chinese language skills (having values of 5, in both cases) found in this candidate location exceed what is required for the product represented by product profile 600 in FIG. 6 (which has corresponding values of 3 and 1, respectively). Thus, there is no "gap" in skills for these criteria; the skill gap numbers are therefore set to 0 in column 1000, as shown at 1001 and 1002.

Once the skill gap numbers are computed for each candidate location, they are preferably summed to create the overall skill gap score for that location. This overall skill gap score can then be compared among the candidate locations. For the 13 sample local skills criteria against which the two geography profiles 900, 910 of FIG. 9 were evaluated, the resulting skill gap scores are 10 and 14, respectively, thus indicating that candidate location "B" has a larger skills gap than candidate location "A". See row 1240 of FIG. 10E, where the overall skills gap scores are presented.

FIG. 10B shows 3 sets (i.e., 6 columns) of location-specific values that are computed using the correlator values in combination with the product profile and geography profiles. In preferred embodiments, an algorithm appropriate for each of the criteria pertaining to local skills is utilized in these computations (and the algorithms may vary from one criteria to another). In the example shown in FIG. 10B, the following algorithm is used for each of the local skills criteria:
  i. The geography profile value is subtracted from the corresponding product profile value.
  ii. If the result is 0 (i.e., there is no skills gap), then a fixed value of 5 is assigned (thereby strongly favoring the candidate location associated with this geography profile in subsequent computations).
  iii. Otherwise, computations are performed using each of the correlators in combination with the corresponding product profile value and geography profile value. The details of the particular computation are not material to the present invention, and different computations may be deemed useful in different embodiments of the present invention.

Using this algorithm, the values in column 1020 therefore represent computations performed using as input the following: the product profile values (illustrated in FIG. 6); the geography profile values for candidate location "A" (illustrated in column 900 of FIG. 9); and the market share correlator values (illustrated in column 710 of FIG. 7). As stated above, preferred embodiments use only those values, in each case, that pertain to local skills.

Similarly, the values in column 1030 represent computations performed using these same inputs, except that the geography profile values for candidate location "B" are used now instead of the values for candidate location "A". The values in columns 1040 and 1050 use the same inputs as columns 1020 and 1030, except that the revenue correlator values (illustrated in column 720 of FIG. 7) are now substituted for the market share correlator values. Finally, the values in columns 1060 and 1070 use the same inputs as columns 1020 and 1030, except that the cost reduction correlator values (illustrated in column 730 of FIG. 7) are substituted for the market share correlator values. (Since values for the cost reduction correlators are not provided, in the sample data shown in FIG. 7, the algorithm that computes values for columns 1060 and 1070 sets each result to 0.)

In preferred embodiments, normalized values are computed for each of the sets (i.e., columns) of values in FIG. 10B by summing the values in each set and then dividing that sum by the number of values in the set. The summed and normalized values for the sample data are shown in rows 1080 and 1090, respectively, of FIG. 10B.

Turning next to FIG. 10C, a per-location score referred to herein as an "opportunity gap" score is illustrated. In preferred embodiments, a set of opportunity gap numbers is computed by subtracting a product each profile value from the corresponding geography profile value for each criteria that pertains to the marketplace (where these marketplace-related criteria are shown, by way of example, at reference numbers 420 and 430 in FIG. 4). In other words, these computations seek to evaluate the opportunity that may exist, within each of the candidate locations, for the product being assessed. Column 1100 in FIG. 10C shows the individual opportunity gap numbers for the candidate location "A" and column 1110 shows the numbers for candidate location "B". Note that if there is no gap for a particular one of the criteria (i.e., the subtraction operation is not a positive number), its opportunity gap number is set to 0 in preferred embodiments.

The values shown in columns 1100 and 1110 may be better understood by referring to the sample product profile 600 in FIG. 6 and the sample geography profiles 900, 910 in FIG. 9. The worldwide market opportunity value of 3 (see reference number 604 in FIG. 6) is subtracted from the location-specific market opportunity value of 5 (see reference number 902 in FIG. 9) for geography profile 900, resulting in an opportunity gap number of 2. In other words, this candidate location is perceived to have significant opportunities for the product being analyzed (as indicated by the opportunity value of 5), whereas the worldwide opportunity for that product is average (as indicated by the opportunity value of 3). The opportunity gap number of 2 that corresponds to this result is shown at reference number 1101 in FIG. 10C. Similarly, by subtracting the worldwide CGR value of 3 from the location-specific CGR value of 4 from geography profile 910, an opportunity gap number of 1 results. This value is shown at reference number 1111 in FIG. 10C.

Once the opportunity gap numbers are computed for each candidate location, they are preferably summed to create the overall opportunity gap score for that location. This overall opportunity gap score can then be compared among the candidate locations. For the 3 sample marketplace-related skills criteria against which the two geography profiles 900, 910 of FIG. 9 were evaluated, the resulting opportunity gap scores are 4 and 2, respectively, thus indicating that candidate location "A" has a larger opportunity gap than candidate location "B". See row 1230 of FIG. 10E, where the overall opportunity gap scores are presented.

Several additional scores that may be generated will now be discussed. In preferred embodiments, the normalized values within each column shown in FIGS. 10B and 10D are summed, for each candidate location, and these results are shown in rows 1200, 1210, and 1220 of FIG. 10E. Thus, the value of 7.07 in column 1180 of row 1200 is the sum of normalized values 2.20 (from column 1020 of FIG. 10B), and from column 1120 of FIG. 10D, the values 0.67, 0.55, 2.20, and 1.45. The value of 6.37 in column 1190 of row 1200 represents the sum of normalized values from column 1030 of FIG. 10B and column 1130 of FIG. 10D. Since values in the columns 1020 and 1120, as well as 1030 and 1130, were created using the market share correlator values from column 710 of FIG. 7, the values in row 1200 therefore represent overall location-specific market share scores.

Similarly, the value 8.99 in column 1180 of row 1210 is created by summing the normalized values from columns 1040 of FIGS. 10B and 1140 of FIG. 10D, and the value 7.83 in column 1190 of this row is created by summing the normalized values from columns 1050 of FIG. 10B and 1150 of FIG. 10D. These summed values were created using the revenue correlator values from column 720 of FIG. 7, and therefore the values in row 1210 represent overall location-specific revenue scores.

Finally, the value 3.33 in column 1180 of row 1220 is created by summing the normalized values from columns 1060 of FIGS. 10B and 1160 of FIG. 10D, and the value 3.51 in column 1190 of this row is created by summing the normalized values from columns 1070 of FIGS. 10B and 1170 of FIG. 10D. These summed values were created using the cost reduction correlator values from column 730 of FIG. 7, and therefore the values in row 1220 represent overall location-specific cost reduction scores.

The location-specific scores shown in FIG. 10E (which may be generally referred to as "resource placement scores") may be analyzed in a number of ways to determine which candidate location should be selected as the optimal location for placement of human resources. Considering only the opportunity gap score, a large opportunity gap suggests that focus on that candidate location may be a high priority (and this may be true even when a different candidate location seems preferable if considering only the skills gap score). Taking another approach, a low overall skill gap score would be preferable for swiftly completing a development activity (or another activity that may be reflected with alternative choices for local skills 410). Considering both gap scores together, a high skill gap score combined with a high opportunity gap score would suggest that additional investment in increasing the skills in that location would benefit the company seeking to place its resources by capturing an increased amount of the unfulfilled opportunity. For the scores shown in rows 1200, 1210, and 1220 of FIG. 10E, a higher value indicates that this candidate location is preferable because of opportunity for improving market share, revenue, and cost considerations, respectively.

Algorithms may be used, if desired, that manipulate a plurality of location-specific scores (such as those shown in FIG. 10E) to yield a single score per location (e.g., by weighting skills gap scores with opportunity gap scores and so forth). It may also be desirable, in some cases, to compute scores over subsets of the criteria, although this has not been illustrated herein.

Block 820 of FIG. 8 stated that the computed scores will be presented to the user. This may comprise presenting all of the information shown in FIGS. 10A-10E, or some subset thereof, such as presenting only the scores from FIG. 10E. Optionally, techniques such as spider graph techniques may be used to overlay all of the scores on a single graph. Spider graphs, which are well known in the art (and are therefore not described herein in detail) enable organizing the scores by groupings of the assessment criteria (e.g., by the groups represented generally at 410, 420, 430, 440, 450, and 460 in FIG. 4), normalizing those values, and presenting the results graphically to allow the user to more readily compare alternatives.

Scores computed using embodiments of the present invention may alternatively be used for purposes other than making an immediate decision as to placement of human resources. For example, if an assessment of candidate locations identifies skills that are consistently lacking, it may be desirable to make investments in one or more of these locations, such as providing funding to universities or providing equipment that is necessary for obtaining required practical experience, thereby proactively assisting the location(s) in closing the skills gap. Although a certain lag time will necessarily accrue before an actual improvement in available skills, the anticipated improvement may optionally be factored into a revised assessment of the location(s).

As has been demonstrated, techniques disclosed herein provide novel ways of making decisions about resource placement, where marketing and growth opportunities are considered rather than simply seeking to minimize cost and expense. When an appropriate emerging market is identified as the optimal choice for resource placement, using comparisons and computations of the type which have been described herein, costs are typically reduced at the same time that revenues are increased, thereby providing an additional benefit to the company.

Particular types of computations have been discussed herein with reference to the sample data that were used in describing operation of preferred embodiments. It should be noted that these computations are merely illustrative of the algorithmic manipulations that may be performed using techniques of preferred embodiments.

It should be noted that the criteria that are important to resource placement decisions for a particular product, product family, or brand may change over time. In addition, the relative importance thereof may change. Therefore, embodiments of the present invention preferably provide flexibility in the assessment process and, in particular, in the criteria that are measured, in the values specified in a product profile, in how the measurements are weighted, and/or in how a product's assessment score is calculated using this information. Similarly, flexibility is preferably provided for updating geography profiles which may have been entered for candidate locations in order to reflect changed location-specific information.

Furthermore, while preferred embodiments have been discussed with reference to evaluating at least two candidate locations, in order to select among those candidates, it may alternatively be advantageous to evaluate a single location (e.g., to determine how well this location meets a product's requirements). Or, a single location may be compared against benchmark values that represent (for example) a hypothetical location or a location in which resources for this product have already been placed. These alternative approaches are deemed to be within the scope of the present invention.

Although preferred embodiments have been described as considering marketing and cost objectives being treated identically among the candidate locations, in alternative embodiments, objectives may be prioritized differently for different locations. For example, costs of the labor pool may vary significantly among the candidate locations: while a personnel cost criterion is depicted as having a single set of associated correlator values (see reference number 731 in FIG. 7), this criterion might be subdivided into more than one criteria, where different correlator values can then be assigned such that the personnel cost in each target location can be weighted differently, thereby allowing for further variations in the location-specific results.

The disclosed techniques may also be used advantageously in methods of doing business. For example, these techniques may be used to provide a resource placement determination service, or to implement a third-party service whereby another company's resource placement decisions can be validated prior to implementation. Fees may optionally be charged for the assessments that are performed. Various revenue models may used for a fee-based service, such as pay-per-use billing, a subscription service, monthly or other periodic billing, and so forth.

As will be appreciated by one of skill in the art, embodiments of techniques of the present invention may be provided as methods, systems, or computer program products. Accordingly, an implementation of techniques of the present invention may take the form of an entirely hardware embodiment, an entirely software embodiment, or an embodiment combining software and hardware aspects. Furthermore, an implementation of techniques of the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of determining resource placement, comprising:

determining plurality of assessment criteria for assessing each of a plurality of candidate locations for placing resources for a product;

creating a product profile for the product, the product profile comprising an importance value assigned to each of a first plurality of the assessment criteria and to each of a second plurality of the assessment criteria, the first plurality pertaining to local skills for the product and the second plurality pertaining to a marketplace of the product;

creating a geography profile for each of the candidate locations, each geography profile comprising a score assigned to each of the first plurality of the assessment criteria and to each of the second plurality of the assessment criteria, each score in each of the geography profiles assigned to indicate how well the candidate location meets the assessment criterion to which the score is assigned;

using computer-readable program code executed by a computer to programmatically compute a skills gap score for each of the candidate locations, further comprising:

computing a plurality of skills gap values for the candidate location by subtracting, for each of the first plurality of the assessment criteria, the score assigned to the assessment criterion in the geography profile for the candidate location from the importance value assigned to the assessment criterion in the product profile; and summing, for each of the candidate locations, each of the computed skills gap values to yield the skills gap score for the candidate location;

using computer-readable program code executed by the computer to programmatically compute an opportunity gap score for each of the candidate locations, further comprising:

computing a plurality of opportunity gap values for the candidate location by subtracting, for each of the second plurality of the assessment criteria, the importance value assigned to the assessment criterion in the product profile from the score assigned to the assessment criterion in the geography profile for the candidate location; and summing, for each of the candidate locations, each of the computed opportunity gap values to yield the opportunity gap score for the candidate location; and using computer-readable program code executed by the computer to programmatically select a particular location from among the candidate locations for placing the resources, based on the programmatically-computed skills gap score for each of the candidate locations and the programmatically-computed opportunity gap score for each of the candidate locations.

2. The method according to claim 1, wherein the resources are information technology personnel.

3. The method according to claim 1, wherein the resources comprise monetary investments in the particular location.

4. The method according to claim 1, wherein programmatically selecting a particular location further comprises selecting the candidate location for which a cost of placing the resources in the candidate location is lowest.

5. The method according to claim 1, further comprising placing the resources in the programmatically-selected particular location.

6. A system for assigning resources, comprising:
a computer comprising a processor and a memory;
a plurality of assessment criteria, stored in the memory, for assessing each of a plurality of candidate locations for placing resources for a product;
a product profile for the product, the product profile stored in the memory and comprising an importance value assigned to each of a first plurality of the assessment criteria and to each of a second plurality of the assessment criteria, the first plurality pertaining to local skills for the product and the second plurality pertaining to a marketplace of the product;
a geography profile for each of the candidate locations, each geography profile stored in the memory and comprising a score assigned to each of the first plurality of the assessment criteria and to each of the second plurality of the assessment criteria, each score in each of the geography profiles assigned to indicate how well the candidate location meets the assessment criterion to which the score is assigned; and
instructions which are executable on the computer, using the processor, to implement functions comprising:
programmatically computing a skills gap score for each of the candidate locations, further comprising:
computing a plurality of skills gap values for the candidate location by subtracting, for each of the first plurality of the assessment criteria, the score assigned to the assessment criterion in the geography profile for the candidate location from the importance value assigned to the assessment criterion in the product profile; and
summing, for each of the candidate locations, each of the computed skills gap values to yield the skills gap score for the candidate location;
programmatically computing an opportunity gap score for each of the candidate locations, further comprising:
computing a plurality of opportunity gap values for the candidate location by subtracting, for each of the second plurality of the assessment criteria, the importance value assigned to the assessment criterion in the product profile from the score assigned to the assessment criterion in the geography profile for the candidate location; and
summing, for each of the candidate locations, each of the computed opportunity gap values to yield the opportunity gap score for the candidate location; and programmatically selecting particular location from among the candidate locations for placing the resources, based on the programmatically-computed skills gap score for each of the candidate locations and the programmatically-computed opportunity gap score for value for each of the candidate locations.

7. The system according to claim 6, wherein programmatically selecting a particular location further comprises selecting the candidate location for which a cost of placing the resources in the candidate location is lowest.

8. A computer program product for determining resource placement, the computer program product embodied on one or more computer-usable storage media and comprising computer-usable program code for:
retrieving a plurality of assessment criteria assessing each of a plurality of candidate locations for placing resources for a product;
creating a product profile for the product, the product profile comprising an importance value assigned to each of a first plurality of the assessment criteria and to each of a second plurality of the assessment criteria, the first plurality pertaining to local skills for the product and the second plurality pertaining to a marketplace of the product;
creating a geography profile for each of the candidate locations, each geography profile comprising a score assigned to each of the first plurality of the assessment criteria and to each of the second plurality of the assessment criteria, each score in each of the geography profiles assigned to indicate how well the candidate location meets the assessment criterion to which the score is assigned;
programmatically computing a skills gap score for each of the candidate locations, further comprising:
computing a plurality of skills gap values for the candidate location by subtracting, for each of the first plurality of the assessment criteria, the score assigned to the assessment criterion in the geography profile for the candidate location from the importance value assigned to the assessment criterion in the product profile; and
summing, for each of the candidate locations, each of the computed skills gap values to yield the skills gap score for the candidate location;
programmatically computing an opportunity gap score for each of the candidate locations, further comprising:
computing a plurality of opportunity gap values for the candidate location by subtracting, for each of the second plurality of the assessment criteria, the importance value assigned to the assessment criterion in the product profile from the score assigned to the assessment criterion in the geography profile for the candidate location; and
summing, for each of the candidate locations, each of the computed opportunity gap values to yield the opportunity gap score for the candidate location; and
programmatically selecting a particular location from among the candidate locations for placing the resources, based on the programmatically-computed skills gap score for each of the candidate locations and the programmatically-computed opportunity gap score for value for each of the candidate locations.

9. The computer program product according to claim 8, wherein programmatically selecting a particular location further comprises selecting the candidate location for which a cost of placing the resources in the candidate location is lowest.

* * * * *